(No Model.) 2 Sheets—Sheet 1.

C. C. & G. E. SHOEMAKER.
BROODER.

No. 587,494. Patented Aug. 3, 1897.

WITNESSES
E. E. Overholt
H. Van Fossen

Clinton C. Shoemaker
and George E. Shoemaker INVENTORS
By W. T. FitzGerald & Co.
ATTY'S.

THE NORRIS PETERS CO., PHOTO-LITHO., WASHINGTON, D. C.

(No Model.) 2 Sheets—Sheet 2.
C. C. & G. E. SHOEMAKER.
BROODER.
No. 587,494. Patented Aug. 3, 1897.
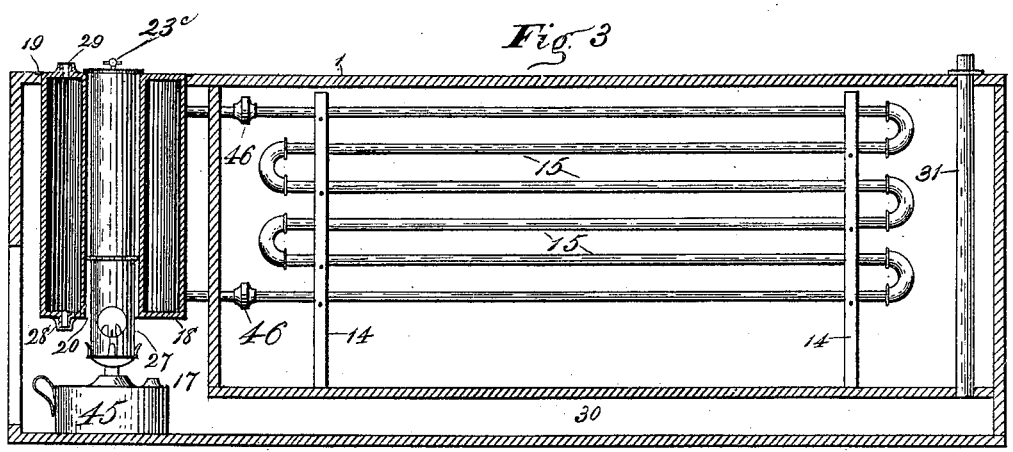
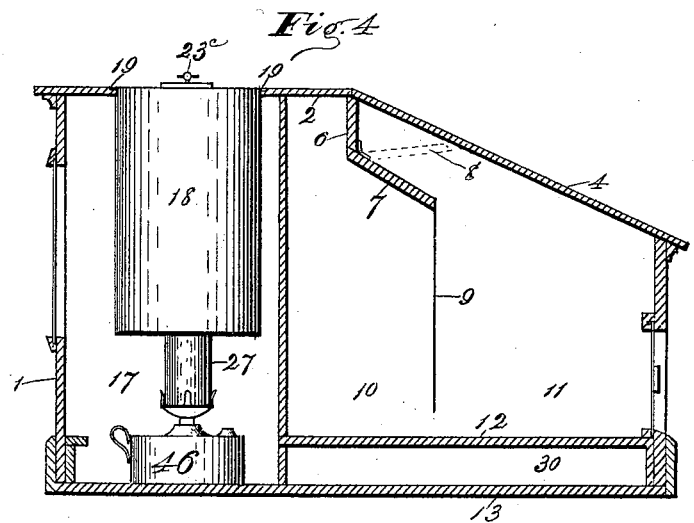
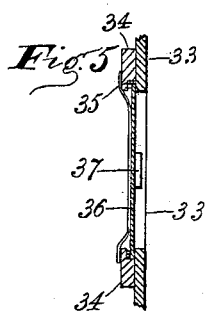
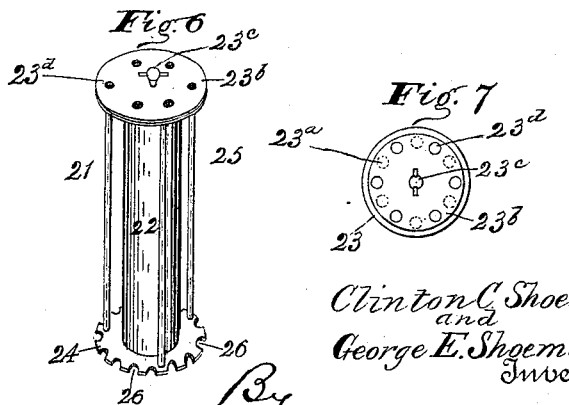
Witnesses
E. E. Overholt
H. Van Fossen
Clinton C. Shoemaker
and
George E. Shoemaker
Inventors
By W. T. Fitz Gerald
Attorneys.
THE NORRIS PETERS CO., PHOTO-LITHO., WASHINGTON, D. C.

UNITED STATES PATENT OFFICE.

CLINTON C. SHOEMAKER AND GEORGE E. SHOEMAKER, OF FREEPORT, ILLINOIS.

BROODER.

SPECIFICATION forming part of Letters Patent No. 587,494, dated August 3, 1897.

Application filed November 18, 1896. Serial No. 612,594. (No model.)

*To all whom it may concern:*

Be it known that we, CLINTON C. SHOEMAKER and GEORGE E. SHOEMAKER, citizens of the United States, residing at Freeport, in the county of Stephenson and State of Illinois, have invented certain new and useful Improvements in Brooders; and we do hereby declare the following to be a full, clear, and exact description of the invention, such as will enable others skilled in the art to which it appertains to make and use the same.

Our invention, as hereinafter fully described and claimed, relates to certain novel features of construction and arrangement of parts involved in the formation of a nursery or brooder the prime object of which is to provide a nursery proper and a feeding-department for young chicks which will at all times be found to be reliably efficient in the performance of their respective functions.

The essential features of our invention reside, it may be stated, in providing a simple heat-generating and feeding apparatus which will establish a uniform temperature, the degree of which may be readily controlled by the operator, and, further, in providing ready accessibility to the interior parts, and also means for thoroughly utilizing all of the heat generated by the lamp.

The advantages, operation, and construction of our invention will be made fully apparent in the following specification and the accompanying drawings.

Figure 1:
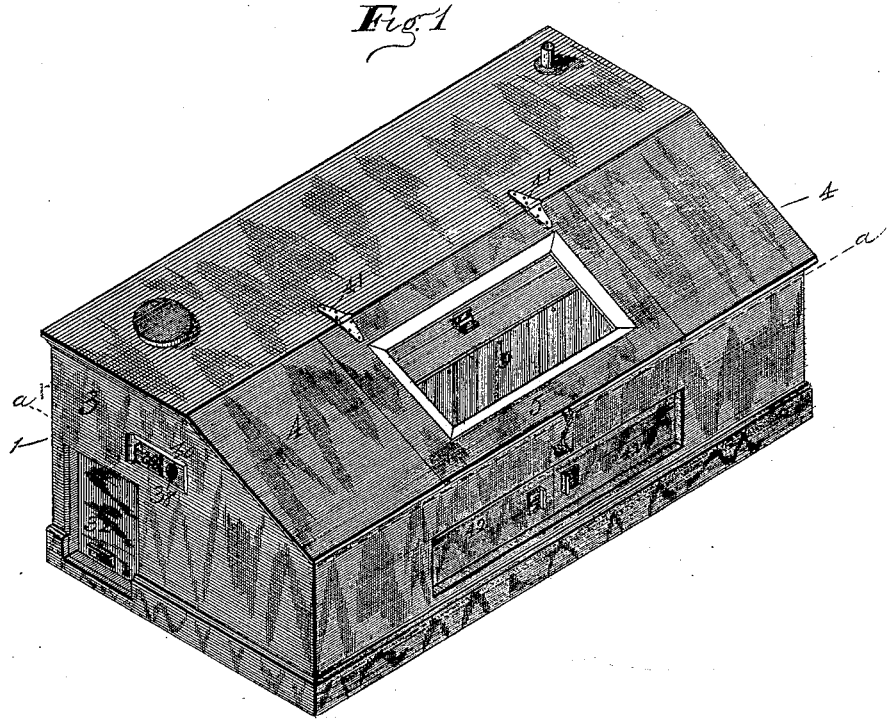
Figure 2:
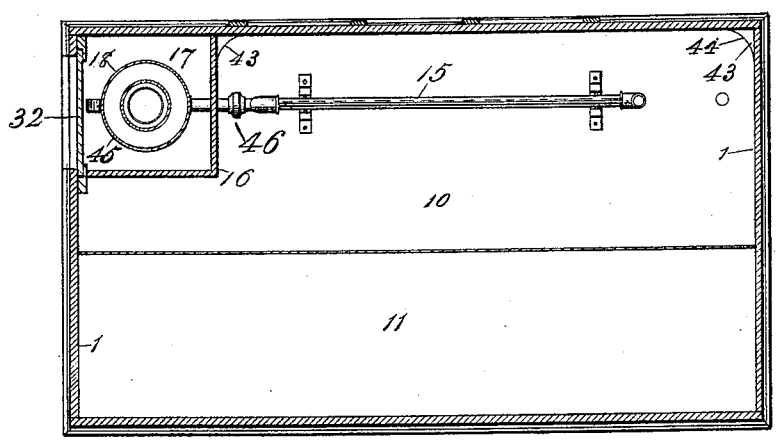

Referring to the drawings, Figure 1 is a perspective view of our improved brooder in its complete operative condition. Fig. 2 is a horizontal section thereof on line *a a*. Fig. 3 is a longitudinal vertical section on a line with the radiators and boiler. Fig. 4 is a transverse section on a central line of the boiler. Fig. 5 is a detail section of the door and securing-cleats therefor. Fig. 6 is a detail perspective view of the removable drum. Fig. 7 is a top plan thereof, showing the controlling-damper.

Reference will be had to the various details involved by figures, the same figure referring to the same part throughout the views.

In carrying out our invention we provide the housing or body 1, which may be made of any preferred shape or dimensions, though we prefer to form the same substantially as shown in Fig. 1, providing it with the rectangular oblong section 2, and the continuation or extension 3 thereof, having the inclined roof 4, in the central portion of which is formed the door 5, adapted to render accessibility to the feeding-department of the brooder.

Along the inner edge of the angle formed by the section 2 and the roof 4 we secure the downward-reaching partition 6, to which is pivotally secured by hinges or otherwise the swinging section 7, which is so secured to the said partition 6 that it will rest in its normal position substantially in a plane parallel with the roof-section 4. By thus hinging the section 7 to the partition 6 its free end may be elevated, as shown by the dotted lines 8, and secured to the roof-section by hooks or other preferred means.

To the free edge of the pivoted section 7 we secure the curtain 9, adapted to extend downward to form a partition between the nursery-section 10 and the feeding-department 11, as more clearly shown in Fig. 4. Within the body-section thus formed we provide the false bottom 12, erected slightly above the bottom proper, 13, the object being to enable the introduction of hot air between the bottoms, thus providing a warm floor for the chicks—a very valuable desideratum.

Along the central section of the nursery we provide the radiator standards or supports 14, adapted to hold in their operative position a coil of hot-water-conveying tubes 15, which may be multiplied in number as deemed necessary.

In one end of the body or housing 1, at a point opposite the radiator-coils, we provide a lamp-compartment, which may be cut off from the nursery-compartment by suitable partitions 16, and within the lamp-compartment 17 thus provided we mount a tubular cylindrical boiler 18, the upper end of which reaches upward through the roof-section, where it is held in position by the flange 19 or in any preferred manner.

Within the tubular section 20 of the boiler we dispose a radiating-drum 21, provided, as shown in Fig. 6, with the cylindrical body 22 and the perforated cap 23, secured thereto by rivets or other preferred means. Said cap is of sufficient diameter to entirely inclose the upper central section of the boiler, and by such means the drum is held in its operative position.

To the lower end of the drum we secure the collar 24, which is of a sufficient diameter to snugly fit within the cylindrical opening of the boiler. Said collar is provided with a central opening sufficient to receive the lower end of the drum, to which it is permanently attached by rivets or otherwise.

In order to more effectively hold the drum in union with its cap and collar, we provide the retaining-standards 25, extending from the cap to the collar and permanently secured to each. After the drum has thus been formed and the periphery of the collar cut away by means of the semicylindrical openings 26 it is placed in its operative position by entering the collar in the upper end of the central opening provided in the boiler until the edge of the cap rests thereon, when the chimney proper, 27, is caused to enter or connect with the lower end of the drum and thus complete the combination.

In order to enable the contents of the boiler to be discharged without the necessity of removing the same from its position, we provide the exit-orifice 28, while water may be supplied to the boiler by an aperture 29, both of which may be provided with a threaded cap or other suitable closure.

The lamp and boiler compartment 17 is connected to or contiguous with the sub air-space 30 beneath the false bottom 12, and as that end of said space opposite the lamp-compartment is provided with the chimney or flue 31 a circulation will be induced, causing the excess of hot air to pass beneath the false bottom and pass out through said chimney, incidentally keeping the false bottom warm to a desired degree. By this arrangement it will be seen that we have not only provided that the nursery and feeding departments proper shall be supplied with a desired temperature, but that the floor also will be warm, thus guarding against the entrance of cold air through any apertures that may be left therein. This feature of our invention we consider a very important and valuable one, providing, as it does, an absolute protection against drafts and a low temperature in that section of the compartments where it is most desirable to have full control thereof.

In order to guard against the entrance of rain, we arrange that the doors provided for the housing or body shall be so constructed that the edges of the doors or windows will not admit rain or wind no matter how inclement the weather, as one of the prime objects of our invention is to enable it to be used out of doors, thus providing within itself a reliable apparatus of the nature above set forth.

In order to render the lamp readily accessible, we provide the door 32, which in the drawings is shown to be so constructed that it will ride in vertical ways secured upon the inner side of the housing.

The construction involved in the method we employ for hanging the door is more clearly brought out in Fig. 5, wherein it is shown that the side walls 33, which are part of the housing 1, are provided with the ways or cleats 34, having their inner edges cut away upon the outer sides thereof to form the recesses 35. When the ways 34 are secured in position in any preferred manner to the walls 33, said recesses are adapted to receive the edges of the door and permit the free movement thereof upwardly or downwardly, as desired.

In order to hold the door in an adjusted position, we provide the retaining-spring 36, which is disposed in a horizontal position and adapted to reach across the upper section of the door, when the ends thereof are secured to the ways 34. The middle section of the spring 36 is bent outward, so that it will contact closely with the inner face of the door and by the friction thus induced will readily hold the door at any point desired.

To render the door more easily controlled, we provide the lip 37, secured to the lower edge thereof, and it will also be understood that a suitable clasp and staple (not shown) may be placed thereon for securing the lamp against unauthorized control.

To provide for a free and perfect ventilation of the interior of the housing, we form the apertures 38, which may be located at any desired point preferred in the ends of the housing.

In order to close the apertures 38 when deemed necessary, a sliding lid or door 39 is provided and adapted to move in suitable ways 40, disposed either horizontally or vertically, as preferred.

In order to render the interior of the housing readily accessible, we provide the door 5, previously referred to, which may be secured to the rectangular oblong section of the body by suitable hinges 41. This door may be provided, if desired, in its central section with glass, enabling the interior to be viewed without the necessity of opening the door. It will be understood that this and the other doors may be provided with suitable locks, if deemed necessary, that the contents may be safely guarded.

To provide that the chicks may leave the brooder in fair weather or when otherwise desired, we arrange the side doors 42, which are preferably mounted in ways similar to those described in Fig. 5 of the drawings. By this arrangement the doors 42 may be moved laterally out of the way, providing an opening to the feeding-department on a line with the floor thereof.

In order to prevent the chicks from becoming wedged in the corners of the compartments, we provide the blocks 43, which upon one side are adapted to fit within the angles of the corners, while their outer faces 44 are rounded, presenting a concavity which will render it impossible for the chicks to become bunched to such an extent as to produce fatalities.

The operation of our combined brooder and feeding apparatus may be stated as follows: A lamp 45 of any preferred and suitable construction is placed within the compartment 17 and the upper end of its flue or chimney entered in or connected with the lower end of the drum 22, and when the flame has been properly regulated the heat thus generated will enter and fill the drum, while the excess thereof will pass through the semicylindrical openings 26, formed in the collar, and rise upward between the outer wall of the drum and the inner wall of the boiler, imparting to the contents of the latter a sufficient degree of heat to raise the temperature of the water within the boiler to the desired point, inducing a circulation of the water through the radiator-coils 15, thence to the lower section of the boiler, as indicated by the arrows in Fig. 3. In some cases it may be found desirable to entirely close the bottom of the drum, in which case the said collar 5, provided with the semicylindrical apertures 26 in the periphery thereof, may be formed integrally with the closing-head for the bottom. This, perhaps, will be found a cheaper construction than to separately form said collar. If the entire lower end of the drum is thus tightly closed, the upper end of the chimney will be so disposed that it will reach within an inch thereof, more or less, as may be found productive of the best results. We desire, however, to reserve the right to construct and use the drum either with an open lower end adapted to receive the upper end of the chimney or to entirely close said end of the drum, as above set forth.

If the drum is used with an inclosed lower end, the heat from the chimney will impinge upon the lower side of the bottom, near the central section thereof, and radiate toward and enter the semicircular openings in the projecting edge or collar rising upward between the drum and the inner face of the boiler.

It will be understood that the products of combustion may pass off from between the drum and the boiler through the sub air-space 30 and the flue 31, though we reserve the right to provide an additional and adjustable exit for said products by forming in the projecting rim or edge of the cap 23 a series of apertures, the size or capacity of which is to be regulated and controlled by a rotary damper pivoted to said cap and provided with a handle suitable for lifting the drum out of its seat, and these parts will be hereinafter fully set forth. If the bottom of the drum is closed, apertures should be provided in its lower side to permit the heat to escape.

Where it is desired to remove the boiler for any purpose and also as a convenience in assembling the parts, we provide the unions 46, enabling the radiator to be easily detached from the boiler.

By the arrangement above set forth it will be seen that almost every particle of heat generated is utilized either for the purpose of heating the water to the desired degree or for warming the false bottom of the feeding and nursery departments.

The cap 23, formed upon the drum, is provided with a series of apertures $23^a$, adapted to permit the exit of the products of combustion. In order to control the draft passing through said apertures, we provide the rotary damper $23^b$, which is pivoted to the central portion of the cap and provided with an operating-button $23^c$, by means of which the damper may be rotated to cause the apertures $23^d$ therein to register with the apertures $23^a$ or entirely or partly close them, as desired.

It will be understood that a suitable cap may be provided outside of the casing, if deemed necessary, to protect the protruding end of the flue of the boiler.

The advantages arising from the use of the construction above set forth are that only a minimum amount of oil is necessary to establish a reliably uniform temperature and that the heat will be conveyed to that portion of the apparatus where it will result in the greatest efficiency of application.

Having thus fully described the construction and operation of our invention, what we claim as new, and desire to secure by Letters Patent, is—

1. As an improvement in brooders the combination with the casing provided with a heating and sub air-chamber, of a tubular boiler mounted in the heating-chamber; a removable drum adapted to fit within said boiler, and provided on its upper end with a perforated cap and a rotary damper therefor, and upon its lower end with a mutilated collar, and a flue or chimney adapted to induce a circulation of heated air through said sub air-chamber, substantially as described and for the purpose named.

2. As an improvement in brooders the combination with the casing provided with a tubular boiler mounted in the heating-chamber of said casing, of a removable drum adapted to fit within said tubular boiler, and consisting of the cylindrical body and perforated cap secured to the upper end thereof, and adapted to close the opening in said boiler, and further, provided upon its lower end with an encircling collar, the periphery of which is provided with openings and means for holding said cap and collar to the drum, and for closing the apertures provided in the cap, as and for the purpose specified.

In testimony whereof we affix our signatures in presence of two witnesses.

CLINTON C. SHOEMAKER.
GEORGE E. SHOEMAKER.

Witnesses:
OWEN T. SMITH,
D. S. BREWSTER.